Figure 1:
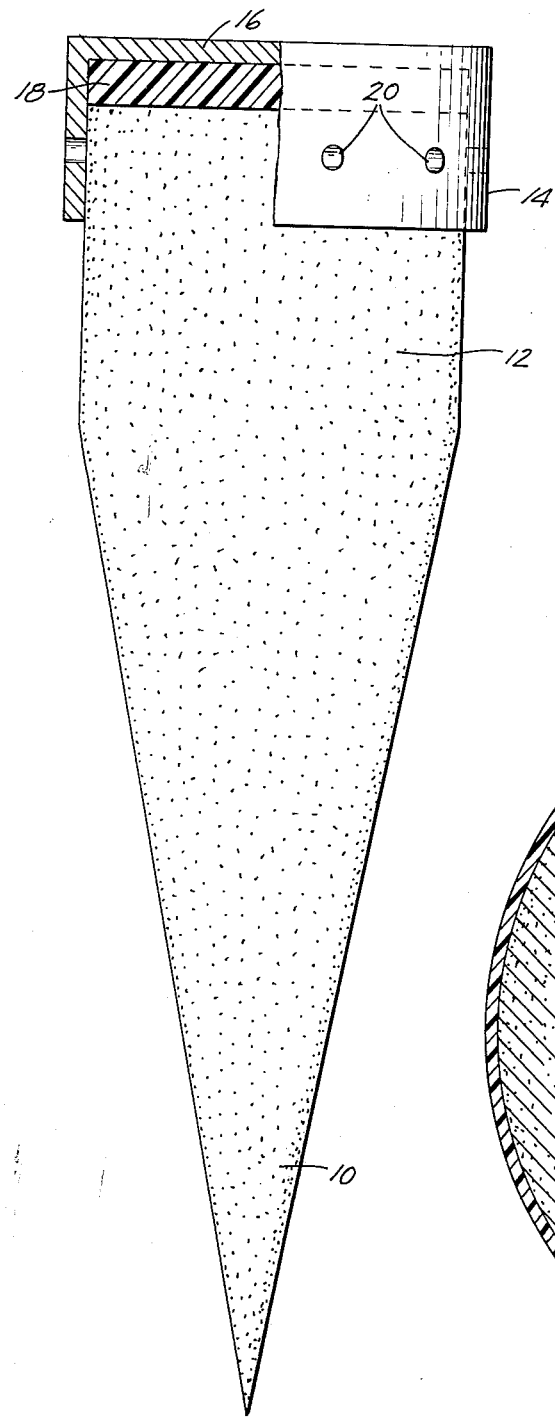

Oct. 9, 1962     A. E. GESSLER     3,057,713
FERTILIZER STICKS
Filed April 4, 1960

INVENTOR.
ALBERT E. GESSLER
BY
Milton Zucker
ATTORNEY

United States Patent Office 3,057,713
Patented Oct. 9, 1962

3,057,713
FERTILIZER STICKS
Albert E. Gessler, 1810 Mohawk Trail, Maitland, Fla.
Filed Apr. 4, 1960, Ser. No. 19,893
4 Claims. (Cl. 71—64)

This invention relates to elongated pointed shapes useful as fertilizers for trees, to the composition of such shapes, and to methods of making them.

In the fertilization of trees, shrubs and the like, proper application of fertilizer to the roots has always been difficult. It is conventional practice to core the earth in the vicinity of the roots, and drop in powdered commercial fertilizers, which then feed the roots over a period of some months, by their slow solution in ground water. This is a most laborious task, due to the wide area over which tree roots generally extend; and it involved disturbing the grass where ornamental trees are set in lawns.

A number of alternate methods of feeding trees have been suggested by prior investigators. In one method, solutions of fertilizer in water are injected into the ground. This method has the great disadvantages of requiring both special equipment and frequent application, the soluble fertilizer being rapidly washed away by ground water.

A second method involves permanent boreholes, with foraminous containers for the powdered fertilizer inserted therein. This method is, like the conventional method, laborious in the extreme, and involves a heavy initial capital outlay. Furthermore, there are many situations where permanent boreholes are an eyesore.

The most ingenious suggestion for reducing labor in feeding fertilizer to trees involves the formation of the fertilizer into long slender pointed shapes, like cones, pyramids or spear heads, the fertilizer being mixed with cementitious materials to form shapes sufficiently hard to be pounded into the ground. Unfortunately, this suggestion has not worked out in practice. Generally, so much cementitious material is needed that the fertilizer content is reduced to a very low figure; alternatively, the shapes are not sufficiently strong to be poundable into anything but the softest ground.

An object of this invention is the production of formed shapes which are high in fertilizer value and yet have sufficient strength to be poundable into the ground about tree roots without breaking.

A further object of this invention is the production of such formed shapes at low cost.

A still further object of this invention is the production of such formed shapes which will slowly disintegrate in the ground over a long period of time, so that they continue to act as a source of nutrient over a period of months.

These and other objects of this invention may be obtained, in accordance with the instant invention, by the surprising discovery that if a standard powdered slowly soluble commercial fertilizer be mixed with about 5 to 20% of its weight of aqueous phosphoric acid (expressed as $H_3PO_4$) and about 5 to 25% of its weight of asbestos into a plastic mass, molded into elongated pointed shapes, air dried for at least 12 hours and then preferably baked, there are obtained shapes which comprise hard, porous, friable interiors surrounded by a thin film which is case-hardened to non-friability, and which softens slowly on immersion in water to permit leaching of the porous interior. These shapes can be hammered into soils without fracturing, particularly if pressure distributing devices as hereinafter described are mounted on the blunt ends of the shapes.

The hardening mechanism apparently involves a reaction between the fibrous magnesium silicate in the asbestos and the phosphoric acid, to form a hard fibrous binder for the mass.

In the practice of the invention, any desired commercial fertilizer, based on superphosphate, may be used. The superphosphate may be of any desired $P_2O_5$ content, depending on the strength desired in the final product. A typical commercial superphosphate fertilizer will contain 50% of gypsum, 25 to 30% monocalcium phosphate, about 5% of di and tricalcium phosphates, some silica, iron oxide, water and various impurities. Such a superphosphate is mixed with a source of nitrogen—generally ammonia or a nitrate, with or without additional nitrogen sources—a source of $K_2O$ (generally potassium chloride—KCl) and such trace minerals as are wanted, and some fillers, to form a dry mixed material in which the slowly soluble phosphates will act as a source of plant food over a period of several months when placed on or in the ground.

*Example 1*

A typical mixed fertilizer, yielding 5% nitrogen, 10% $P_2O_5$ and 5% $K_2O$, may be made by blending:

500 pounds superphosphate (10% $P_2O_5$)
17 pounds liquid ammonia
12 pounds urea
66 pounds ammonium sulfate
42 pounds sodium nitrate
140 pounds tankage (7% nitrogen) dry basis
83 pounds KCl (60% $K_2O$)
140 pounds inert materials Similar materials containing more superphosphate and less of the inert minerals may be used; the sources of nitrogen and potassium oxide may be altered; and trace elements may be added to the fertilizer. It is only essential that the fertilizer be powdered, and consist essentially of superphosphate mixed with sources of nitrogen and $K_2O$.

The superphosphate mixed fertilizer is then blended with aqueous phosphoric acid and asbestos fibers—preferably short fibers of relatively uniform length. About 5 to 25% of asbestos fiber, based on the dry powdered fertilizer, is used, and about 5 to 20% of phosphoric acid calculated as $H_3PO_4$, based on the dry powdered fertilizer, with sufficient water to make a dough. There may also be added minor percentages of fertilizer ingredients. The dough is then kneaded and formed into shapes.

Figure 2:
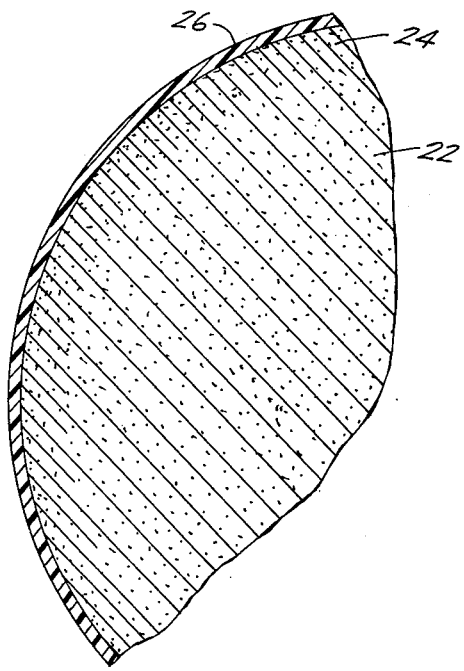

A typical shape which can be used for the practice of this invention is shown in the drawings, by way of example and not by way of limitation. In the drawings FIGURE 1 is an elevation, partially in section.
FIGURE 2 is a section on the line 2—2 of FIGURE 1.

As shown in FIGURE 1 of the drawings, the elongated pointed shape of this invention is in the form of a cone 10, with a cylindrical top 12. Immediately after the form is molded, a cylinder cap 14 of thin bright iron or similar material, open at the bottom, and having an end 16, is placed over the cylindrical head of the molded cone. A compression gasket 18 of compressible material is placed in the cap adjacent the end 16; it may be sponge rubber or plastic, or simply ordinary rubber. One or more holes 20 are provided in the cap cylinder 14, so that any air caught between the plastic mass and the cap cylinder will escape as the cap is pushed down against the moldable material.

As shown in FIGURE 2, the cone, after drying as hereinafter described, comprises an interior porous hard friable mass 22, surrounded by a thin surface film 24 which is case hardened, and non-friable.

If desired, the cone may be further treated with a surface coating 26, preferably one which is water soluble, to give it slip and a smooth appearance.

Typical examples of compositions useful in the invention are the following:

*Example 2—Low Concentration Stick*

120 pounds mixed fertilizer of Example 1—20 mesh
20 pounds short fiber asbestos
45 pounds 50% aqueous orthophosphoric acid
25 pounds water This formed a uniform dough when kneaded. The dough was formed into cones as described above, 7½ inches long and 1¼ inches in diameter at the top. The cones were air dried for 24 hours, then dried in an oven at 70° C. for 24 hours. They weighed 160 grams each, contained 3.7% N, 16% $P_2O_5$, 3.7% $K_2O$. On breaking open, they showed a thin case hardened film about a hard macro-porous interior, which was friable at the point of fracture, as distinguished from the non-friable relatively smooth surface of the cone.

The composition can be enriched in fertilizer value, with various additives. For example, a high $K_2O:N$ formulation can be made as follows:

*Example 3—High Concentration Stick*

205 pounds mixed fertilizer of Example 1—20 mesh
34 pounds asbestos as Example 2
60 pounds $KNO_3$—granular
76 pounds 50% aqueous orthophosphoric acid
40 pounds water This was kneaded into a dough, and formed into cones 9 inches long, with a 2" diameter at the top. The cap used was 1¼ inches high. The cones were air dried 24 hours, oven dried at 70° C. for 36 hours. They weighed about 370 grams each, contained 5.5% N, 13.7% $P_2O_5$, 11% $K_2O$.

The dried cones may be made more slippery by rubbing mica powder or wax over their surfaces, or by coating with a water soluble film former such as water soluble urea formaldehyde resin. Such resin films, being catalyzed by the phosphoric acid on the surface, will set very rapidly and form a glossy very hard smooth coating, which will slowly break up when the cone is immersed in water or in the ground. If desired, these coatings may be colored by the use of pigments or dyes.

In producing the cones, it is desirable to air dry them after molding for at least twelve hours. This induces a migration of ingredients, so that on further drying, preferably by baking, the surface layers of the cones, containing a higher ratio of binding phosphoric acid, set up to provide the cones with relative non-porous non-friable shells surrounding relatively porous friable interiors, thus permitting more ready penetration of hard soils by the cones.

The temperature for finishing the cones is a matter largely of choice. Room temperature drying takes too long; initial temperatures about 90° C. may cause splitting of the cones due to too rapid evaporation of water. However, once the water is largely gone, any desired temperature may be used. Temperatures from about 50° C.–80° C. are preferred, or the cones may be passed through a drier on a moving grate, in which the temperatures are raised gradually to as high as several hundred degrees centigrade.

The provision of a metallic head with a compression gasket also is designed to improve the penetration achievable by the cones into hard soils. The compression gasket distributes the force of a blow, and thus diminishes the tendency of a cone to shatter while it is being driven into the ground.

Obviously, other changes can be made in the examples without departing from the scope of the invention as defined in the claims. In particular, as pointed out above, there is nothing critical in the materials used to compound the dry basic superphosphate fertilizer used, and the proportions of asbestos fiber and phosphoric acid can be varied within the claimed limits.

What is claimed is:

1. A pointed elongated stick of a composition obtained by drying an aqueous molded dough consisting essentially of a powdered superphosphate fertilizer, 5 to 25% of the weight of fertilizer of asbestos fiber, and 5 to 20% of the weight of phosphoric acid expressed as $H_3PO_4$, the stick having a relatively non-porous non-friable exterior surface and a porous, hard friable interior, the non-porous, non-friable exterior having a higher concentration of phosphoric acid than the porous, hard, friable interior.

2. The stick of claim 1, to which is molded a metallic head, and a compression gasket between the metallic head and the composition.

3. The method of making a fertilizer stick capable of being driven into the ground, which comprises mixing an aqueous dough consisting essentially of a powdered superphosphate fertilizer, 5 to 25% of the weight of fertilizer of asbestos fiber, and 5 to 20% of the weight of fertilizer of phosphoric acid, expressed as $H_3PO_4$, molding the dough into pointed, elongated forms, air drying the forms for 12 hours, and thereafter removing the remaining water therefrom whereby the surface of the stick becomes relatively nonporous and non-friable while the interior thereof is porous, hard and friable.

4. The method of making a fertilizer stick capable of being driven into the ground, which comprises mixing an aqueous dough consisting essentially of a powdered superphosphate fertilizer, 5 to 25% of the weight of fertilizer of asbestos fiber, and 5 to 20% of the weight of fertilizer of phosphoric acid expressed as $H_3PO_4$, molding the dough into pointed, elongated forms, and mounting on the forms a cap containing a compression gasket therein, air drying the forms for at least 12 hours, and oven-drying the forms to remove the remaining water therefrom whereby the surface of the stick becomes relatively nonporous and non-friable while the interior thereof is porous, hard and friable.

References Cited in the file of this patent

UNITED STATES PATENTS

| | | |
|---|---|---|
| 879,877 | Kennedy | Feb. 25, 1908 |
| 1,971,390 | Van Yahres | Aug. 28, 1934 |
| 2,032,608 | Antrim | Mar. 3, 1936 |
| 2,117,808 | Jones | May 17, 1938 |
| 2,341,800 | Martin et al. | Feb. 15, 1944 |